Jan. 9, 1968   A. L. BARNES   3,362,641
PREDETERMINED AREA SPRINKLER
Filed July 26, 1965   3 Sheets-Sheet 1
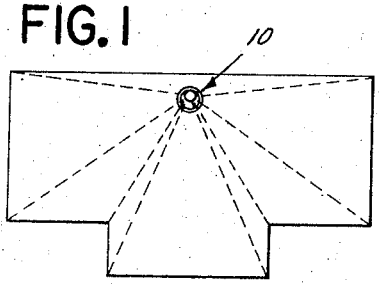
FIG. 1
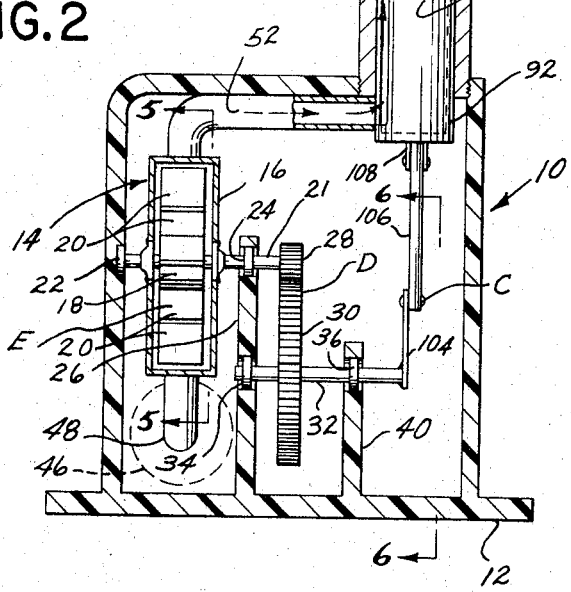
FIG. 2
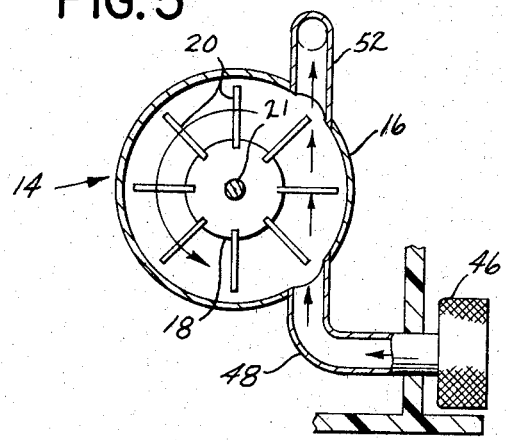
FIG. 5
FIG. 3
FIG. 4
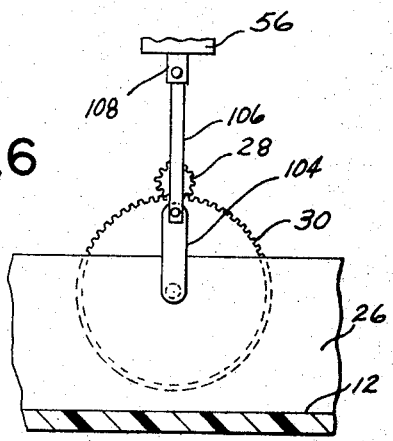
FIG. 6
INVENTOR.
ARTHUR L. BARNES
BY
Bernard D. Brown
ATTORNEY Jan. 9, 1968    A. L. BARNES    3,362,641
PREDETERMINED AREA SPRINKLER
Filed July 26, 1965    3 Sheets-Sheet 2
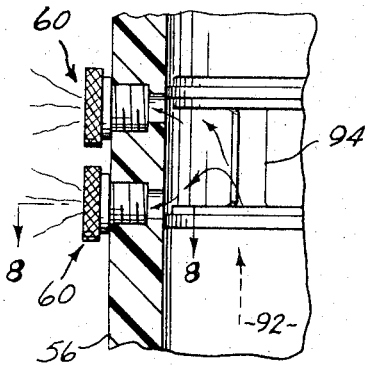
FIG. 7
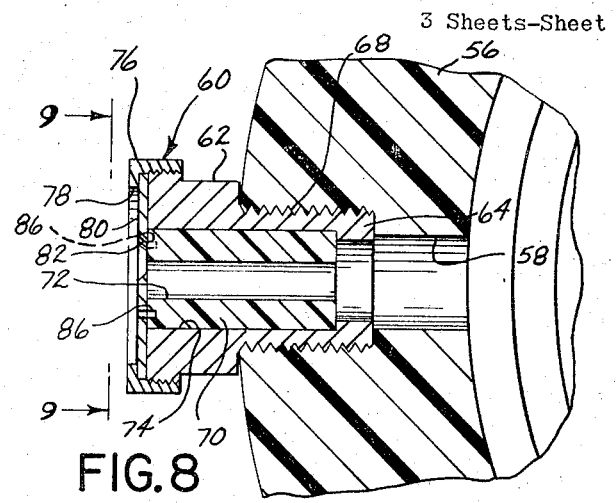
FIG. 8
FIG. 9
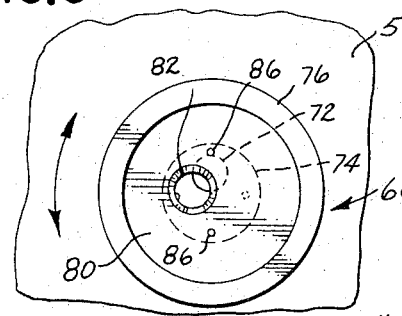
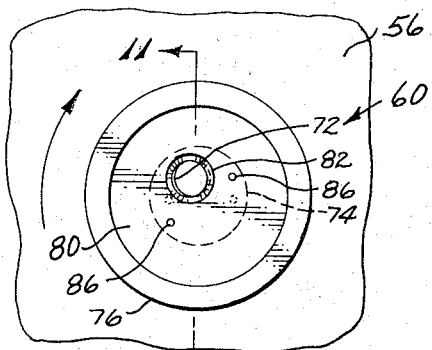
FIG. 10
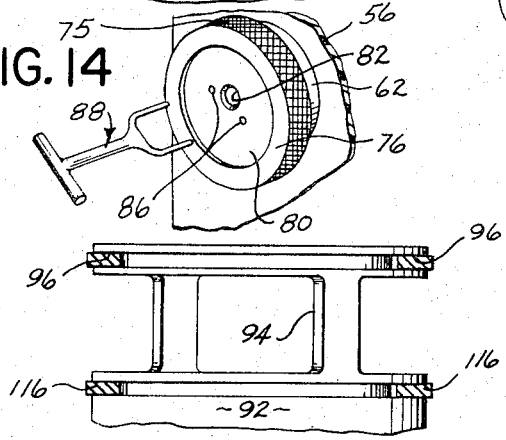
FIG. 14
FIG. 12
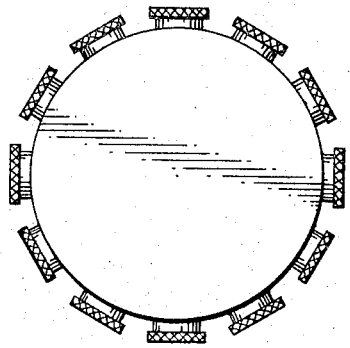
FIG. 13
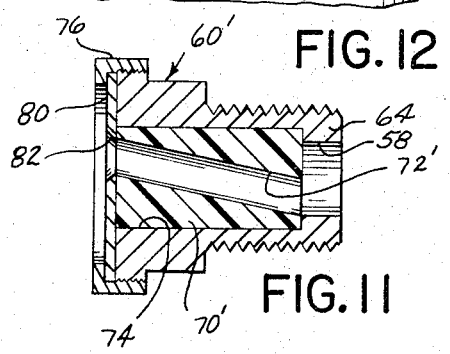
FIG. 11
INVENTOR.
ARTHUR L. BARNES
BY
Boniard J. Brown
ATTORNEY

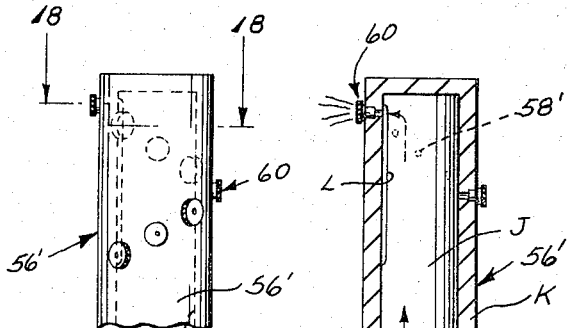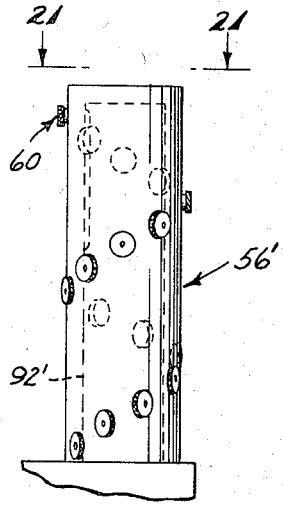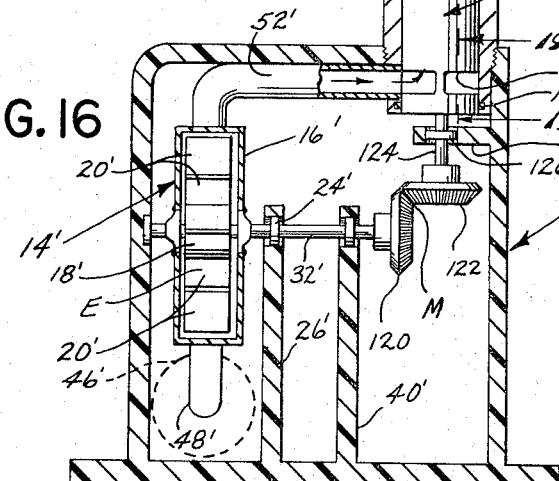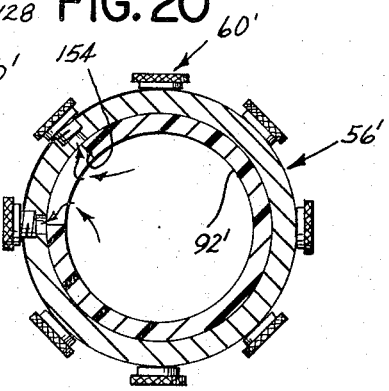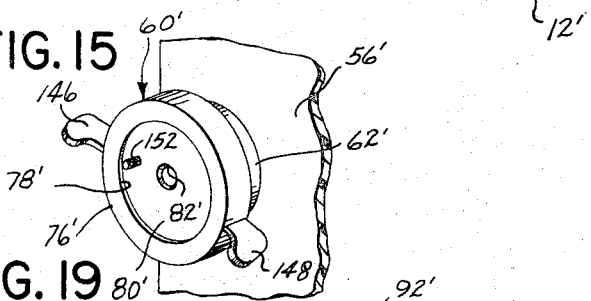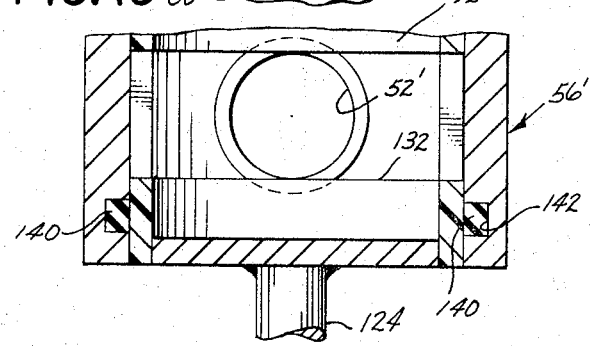

United States Patent Office 3,362,641
Patented Jan. 9, 1968

3,362,641
PREDETERMINED AREA SPRINKLER
Arthur L. Barnes, 4509 Rosemead Blvd.,
Rosemead, Calif. 91770
Filed July 26, 1965, Ser. No. 474,550
3 Claims. (Cl. 239—97)

ABSTRACT OF THE DISCLOSURE

A sprinkling device having an array of discharge apertures and means for opening apertures in a predetermined program to sprinkle an area of predetermined configuration.

---

The present invention relates generally to sprinklers; more particularly, the invention relates to a novel system for lawn sprinkling wherein selective and adjustable means are employed to direct spray over accurately predetermined areas.

A wide variety of sprinkling mechanisms for lawns are provided in the prior art. None has adjustable orifices arranged so that predetermined groups thereof are selectably controlled to provide a desired area of coverage, and none provides therein water motor-actuated means for actuating the sprinkler and the head or heads thereof. Prior art sprinklers do not provide adjustability of individual nozzles to achieve directionality and controlled spray distance.

The novel sprinkler according to the present invention is of a type embodying a water motor for rotatably driving the sprinklers or sprinkler head. The new sprinkler includes improved means to sprinkle an area of predetermined configuration, which has many advantages as is apparent to those skilled in the art.

The mechanism of a sprinkler according to this invention comprises a sprinkler head preferably in the form of a tubular assembly having a plurality of adjustable sprinkler orifices. These adjustable orifices are arranged preferably in a helical configuration. Within the tube there is a movable cylinder having an opening therein which cooperates with the inlets to nozzles in the sprinkler. The cylinder forms a piston which is moved in accordance with a predetermined oscillating pattern to expose and mask the openings to the sprinkler nozzles so that certain nozzles are open and others closed to cause a predetermined area to be sprinkled.

The nozzles themselves embody adjustable means to control the direction of discharge from each nozzle and also the distance to which the spray or discharge from each nozzle will reach. The latter is accomplished by adjusting the nozzle orifice.

Different embodiments of the invention are provided, characterized particularly in that a different pattern of movement is imparted to the piston or piston sleeve in the sprinkler tube or head. The tube may be reciprocated axially by means of the water motor or it may be rotated continuously in a clockwise or counterclockwise direction with similar results being accomplished in either case.

It is therefore an object of the present invention to provide an improved and simplified sprinkler of the type described capable of accurately and effectively sprinkling a predetermined area or configuration.

An object of the invention is the provision of a simplified, improved, and effective sprinkler of the reciprocating or oscillating type which is easy to fabricate and economical to produce.

An object of this invention is to provide a sprinkler for predetermined area coverage wherein the result is realized in a sprinkler head having axial and angularly spaced orifices thereon and means cooperating with the orifices to selectively open and mask off predetermined ones of the orifices to sprinkle an accurately predetermined area or configuration.

Another object of this invention is to provide a sprinkler of the type covering predetermined areas wherein cooperating individually adjustable orifices are provided, which may be adjusted to vary the distance over which water will be discharged or sprayed therefrom and also to control the direction of the spray from individual orifices.

Other objects, features and advantages of the present invention will become apparent to those versed in the art from a consideration of the following description, the appended claims and the accompanying drawings, wherein:

FIGURE 1 is a diagrammatic view of an area to be sprinkled, shown in relation to a sprinkler according to the present invention;

FIGURE 2 is an elevational sectional view of a preferred embodiment of the pattern sprinkler of the present invention;

FIGURE 3 is a partial elevational view of the cylindrical housing or distributor head of the pattern sprinkler of FIGURE 2;

FIGURE 4 is a partial plan view taken at line 4—4 of FIGURE 3;

FIGURE 5 is a partial sectional view taken at line 5—5 of FIGURE 2;

FIGURE 6 is a partial sectional view taken at line 6—6 of FIGURE 2;

FIGURE 7 is a fragmentary sectional view taken at line 7—7 of FIGURE 3 showing nozzles in relation to piston openings;

FIGURE 8 is an enlarged fragmentary sectional view taken at line 8—8 of FIGURE 7;

FIGURE 9 is a fragmentary elevational view taken at line 9—9 of FIGURE 8;

FIGURE 10 is a view similar to the view of FIGURE 9 showing a nozzle with its components in a position of adjustment different from that shown in FIGURE 9;

FIGURE 11 is a sectional view taken at line 11—11 of FIGURE 10;

FIGURE 12 is an enlarged fragmentary view showing the upper portion of the piston member of the pattern sprinkler of FIGURE 2;

FIGURE 13 is an enlarged view, similar to the view of FIGURE 4, showing a modified form of cylindrical housing member having twelve nozzles helically arranged thereon;

FIGURE 14 is a fragmentary perspective view of a preferred form of nozzle utilized with the invention, together with a tool for rotating and adjusting the nozzles;

FIGURE 15 is a view similar to the view of FIGURE 14, and showing a modified form of nozzle;

FIGURE 16 is an elevational sectional view similar to the view of FIGURE 2 showing another embodiment of the pattern sprinkler of the invention;

FIGURE 17 is a partial elevational view of the cylindrical housing portion of the sprinkler of FIGURE 16;

FIGURE 18 is an enlarged sectional view taken at line 18—18 of FIGURE 17;

FIGURE 19 is an enlarged sectional view taken at line 19—19 of FIGURE 16;

FIGURE 20 is a partial elevational view of a modified form of the embodiment of FIGURE 16 showing a cylindrical housing portion with sixteen helically arranged nozzles and a modified piston member; and FIGURE 21 is an enlarged view taken at line 21—21 of FIGURE 20.

Referring to the drawings, FIGURES 1 through 14 illustrate a preferred form of the invention which comprises a housing 10 having a base 12 which may be made of plastic or other similar material. Suitably mounted within the housing is a water motor 14 which includes a generally cylindrical housing 16, enclosing an impeller 18 having radially extending vanes 20. The impeller is mounted on a shaft 21, one end of which is journaled in a bearing 22 supported in housing 10. The other end of shaft 20 is supported in another bearing 24 supported in an upright 26 upstanding from the base 12 of the housing 10. On the end of shaft 21 is a pinion gear 28, meshing with a larger gear 30, mounted on a shaft 32. Shaft 32 is journaled in bearings 34 and 36. Bearing 34 is suitably supported in the upright 26, and bearing 36 is supported in an upright 40, upstanding from the base 12.

At 46 in FIGURE 5 there is shown the fitting or coupling to which a garden hose may be attached and which connects to tube or pipe 48, forming the inlet to the water motor 14. Housing 16 has an outlet pipe 52 which connects to a cylindrical distributor in the form of a stand pipe 56. Stand pipe or distributor head 56 has disposed thereabout a plurality of discharge openings 58, which are arranged in the form of a helix in the sides of the tube or stand pipe 56.

Each of the discharge openings 58 is controlled by an adjustable nozzle control fitting 60 which is shown in greater detail in FIGURE 8. Each fitting 60 comprises a threaded plug 62, having a threaded inner end 64 inserted into a threaded counterbore 68 in the end of nozzle opening or aperture 58. Within fitting 62 is an insert of cylindrical form 70, which may be made of a suitable material such as plastic. The insert 70 has a bore 72 of suitable size to provide a discharge stream of appropriate magnitude. The insert 70 fits in the bore 74 within fitting 62, the insert being removable and replaceable by inserts having bores of different sizes. The fitting 62 is of larger diameter at the outer end and is externally threaded as shown to receive a threaded end cap 76 having a circular opening 78 therein. End cap 76 holds an orifice plate 80 against the outer face of fitting 62. Plate 80 has an orifice 82 therein which includes two holes therein, as shown at 86, to receive the prongs of the forked tool 88, used to rotate the orifice plate 80, and therefore to adjust the position of the orifice 82 with respect to the bore 72 in the insert 70. In this manner, the direction of the discharge or spray from the adjustable nozzle can be controlled to direct it upwardly or downwardly, or at any angle with respect to the bore 72. This type of adjustment is illustrated in FIGURES 9 and 10.

The discharge of water from the various orifices or openings 58 is controllably programmed by the sliding sleeve or piston 92 within the distributing head or stand pipe 56. This piston has angularly spaced openings 94 in its upper end as shown positioned between annular grooves in the piston which may have sealing rings in them as designated at 96. In one side of the piston or sleeve 92 near one end there is an axial opening 102, which cooperates with the orifices 58 as the piston is moved to allow discharge of water from them.

The piston 92 is reciprocably driven by the water motor 14. On the end of the shaft 32 is a crank arm 104, pivotally connected to a connecting rod 106, one end of which is pivoted to a yoke 108 at the lower end of the piston 92, as shown. As may be seen therefor, as water motor 14 operates, it drives gear train and crank 104 to actuate piston 92 reciprocally in cylinder or stand pipe 56 at an appropriate rate such that the orifices 94 or openings 94 align with and thus uncover the orifices or openings 58 in accordance with the predetermined program allowing water to be discharged from the corresponding nozzles. FIGURE 7 is a more detailed view, showing the manner in which water may escape through the openings 94 and be discharged from the nozzle member 60 when the openings 94 are opposite corresponding openings or orifices 58. The axial opening 102 allows entrance of water from the water motor to the cylinder 92 in various axial positions of the cylinder.

FIGURE 12 shows the details of construction at the upper end of the piston 92. Piston rings 116 may be used in the annular grooves 96. The openings 94 may be of rectangular shape as shown, provided in side walls of the piston 92.

A slightly modified form of nozzle fitting is shown at 60'. Nozzle fitting 60' is different in that the insert 70' has a diagonally positioned bore 72'. By rotating the position of the insert 70' in the fitting 60', the direction of discharge through the orifice or bore 72' can be adjusted. By rotatably adjusting the orifice plate 80, the orifice 82 can be made to coincide with more or less of the opening at the end of the bore 72' to control the volume of magnitude of the water discharged. That is, orifice 82 exposes a part of the end of orifice or bore 72' and eclipses part of it as shown illustratively in FIGURES 9 and 10.

FIGURE 13 illustrates an arrangement with twelve nozzles helically arranged, this figure being illustrative of other arrangements with different numbers of nozzles differently spaced. FIGURE 4 shows an arrangement with eight nozzles.

From the foregoing, the operation of the invention will be clear to those skilled in the art. The incoming water drives the water motor 14 which through shaft 24 and gears 28 and 30 operates the piston 92 reciprocally at a suitable speed via crank 104. The water discharged from the water motor 14 enters the interior of the cylinder 92 of the distributor head 56 via tube 52. The cylinder 92 operates in a programmed manner to expose the openings 58 to allow water to pass through the openings 94 and be discharged from the helically arranged nozzle fittings 60. The pattern, as shown in FIGURE 1, that is sprinkled is determined by a combination of those nozzles which are wholly or partially opened and those which are closed, and also by the adjustmemnt of nozzles 60 which determines the distance to which water is sprayed from them. As is apparent, by selection of nozzles 60 to be used and adjustment of the distance to which water is sprayed from them, an area of any particular pattern or configuration can be sprayed with the machine operating cyclically to discharge from nozzles in accordance with the program thereof.

FIGURES 17 to 21 of the drawings show a modified form of the invention in which similar parts to those in prior figures are identified by similar numerals primed. In this form of the invention, the operation is similar except that the sleeve or piston 92', instead of being reciprocated, is rotated continuously in one direction. On the end of the shaft 32' is a bevel gear 120 which meshes with a bevel gear 122 of a shaft 124. This shaft is journaled in a bearing 126, supported in a member 128, extending inwardly from a side wall of the housing 10'. The shaft 124 is connected to the lower end of the piston 92'. The piston has openings 132 near its lower end which cooperate with the end of the pipe 52' to admit water to the interior of the piston 92'. The piston has a helical pattern of openings 58, similar to those of the previous embodiment. FIGURE 19 shows the details of construction at the lower end of the piston 92'. Preferably the piston is sealed by the sealing ring 140 in an annular groove 142 internally at the lower end of the cylinder or tubular member 56'.

FIGURE 15 shows a slightly modified form of nozzle assembly 60'. The cap 76' has extending wings 146 and 148 to permit cap 76' to be turned manually. The orifice plate 80' has an extending pin 152 for turning it by hand.

The piston member 92' has an axial opening in the side thereof as designated at 154 which cooperates with the orifices 58' of the adjustable nozzles as the sleeve or piston 92' is rotated in the manner described. FIGURE 18 shows the relationship of the parts with eight adjustable nozzles shown.

FIGURE 21 shows a modified form of the invention with sixteen nozzles in a similar helical array.

From the foregoing, the operation of this form of the invention will be apparent to those skilled in the art, it being similar to that of the previous embodiment except that the sleeve or piston 92' is continuously rotated in one direction by the water motor rather than being reciprocated. The orifices 58' become exposed or opened by the slot 154 as the sleeve or piston 92' is rotated so that the nozzles are opened for discharging in accordance with a predetermined pattern. As in the previous embodiment, the direction and distance of the spray or discharge from the nozzles is controlled by their individual adjustment, and by which ones are opened for use. In this manner, an area of any particular predetermined shape or configuration can be sprayed as desired.

Those versed in the art will appreciate that the present invention achieves the objects and realizes the advantages hereinbefore mentioned. The invention, as pointed out, is simple in operation, extremely easy to fabricate and produce and is economical and extremely effective for its purpose.

Although specific embodiments of the present invention have been illustrated and described herein, it will be understood that the same are merely exemplary of presently preferred embodiments capable of attaining the objects and advantages hereinbefore mentioned, and that the invention is not limited thereto; variations will be readily apparent to those versed in the art, and the invention is entitled to the broadest interpretation within the terms of the appended claims.

The inventor claims:

1. In a sprinkler for spraying a predetermined area, a housing enclosing a water motor having an inlet coupled with a source of water supply and an outlet, drive coupling means connected to said water motor and being driven thereby when water from said source passes through said motor; apertured means communicating with said outlet in said water motor to receive the water passing therethrough and having adjustable nozzle means adapted to project said water in predetermined directions and volumes in accordance with the adjustment thereof; and a movable sleeve within said apertured means having perforations therein alignable with apertures in said apertured means, said sleeve being coupled with said drive coupling means and movable thereby to move within said apertured means to allow water through said aligned perforations and apertures, whereby the water is sprayed out of said apertures in accordance with the predetermined pattern of alignment of apertures and perforations and the movement of said sleeve to cover a predetermined area in a predetermined water spray pattern.

2. A sprinkler according to claim 1, wherein said drive coupling means is a crank to drive said sleeve reciprocally within said apertured means.

3. A sprinkler according to claim 1, wherein the drive coupling means thereof is a rotary motion transmission means to drive said sleeve rotatably in one direction within said apertured means.

References Cited

UNITED STATES PATENTS

| | | | |
|---|---|---|---|
| 640,547 | 1/1900 | Duffie | 239—541 |
| 2,780,488 | 2/1957 | Kennedy | 239—97 |
| 2,999,643 | 9/1961 | Kennedy | 239—97 |
| 3,051,183 | 8/1962 | Jacobs | 239—237 |
| 3,174,689 | 3/1965 | McInyre | 239—541 |
| 3,217,987 | 11/1965 | Valtanen et al. | 239—541 |

EVERETT W. KIRBY, *Primary Examiner.*